June 27, 1967     E. F. GARDNER     3,327,818

THROTTLE STOP AND HOLDING DEVICE

Filed Oct. 22, 1965     2 Sheets-Sheet 1

INVENTOR.

EDSON F. GARDNER

BY Kimmel, Crowell & Weaver

ATTORNEYS.

June 27, 1967 E. F. GARDNER 3,327,818
THROTTLE STOP AND HOLDING DEVICE
Filed Oct. 22, 1965 2 Sheets-Sheet 2
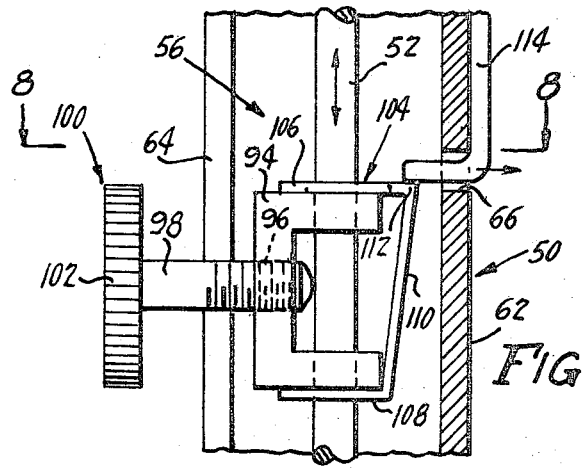
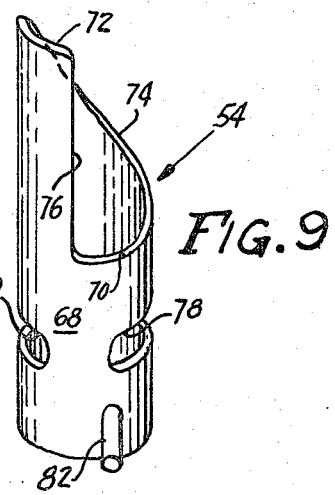
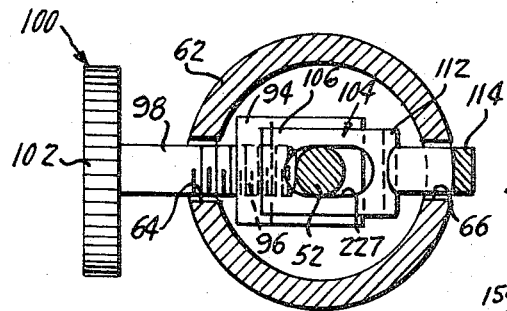
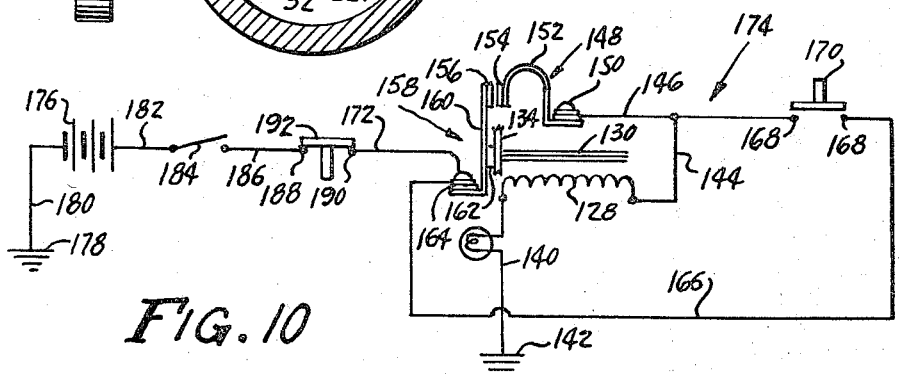
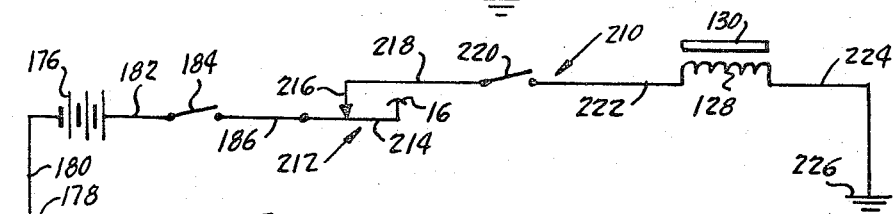
INVENTOR.
EDSON F. GARDNER
BY *Kimmel, Crowell & Weaver*
ATTORNEYS.

3,327,818
THROTTLE STOP AND HOLDING DEVICE
Edson F. Gardner, Conyngham, Pa.
(1925 79th Ave., Greenbrier, Vero Beach, Fla. 32960)
Filed Oct. 22, 1965, Ser. No. 501,070
14 Claims. (Cl. 192—3)

This invention relates to a throttle control, and more particularly to a device of this type for selectively establishing a minimum and maximum rate of speed for the vehicle to which it is operatively attached, and constitutes an improvement over the device disclosed in my co-pending application Serial No. 424,701 filed January 11, 1965 and now Patent No. 3,293,937.

It is an object of the instant invention to provide a throttle control which may be selectively adjusted to maintain an associated vehicle engine at a predetermined constant maximum speed.

Another object of the instant invention is to provide a throttle control for maintaining an associated vehicle engine in a constant predetermined intermediate speed.

Still another object of the instant invention is to provide a throttle control of the type described in which the predetermined maximum speed and the predetermined intermediate speed may be varied by the vehicle operator.

A further object of the instant invention is to provide a throttle control for maintaining the speed of an associated vehicle engine at a predetermined intermediate rate.

A still further object of the instant invention is to provide a throttle control which may be readily attached to any existing motor vehicle with a minimum of time, effort and expense, or which may be readily supplied as a component part of new vehicles.

A still further object of the instant invention is to provide a throttle control device of the character described which is sturdy and durable in construction, reliable and efficient in operation, and relatively simple and inexpensive to manufacture, assemble and utilize.

Still another object of the instant invention is to provide a throttle control for maintaining the speed of an associated vehicle engine at a predetermined rate, including means for allowing the engine rate to decrease upon braking of the vehicle.

Other objects and advantages of the instant invention, as well as the invention itself, reside in the combination of elements, arrangements of parts, and features of construction and operation, all as will be more fully pointed out hereinafter and disclosed in the accompanying drawings wherein there are shown preferred embodiments of this inventive concept.

In the drawings:

FIGURE 5 is a transverse cross-sectional view of the throttle control device of FIGURES 3 and 4 taken substantially along line 5—5 of FIGURE 3 viewing in the direction of the arrows;

FIGURE 6 is another transverse cross-sectional view of the throttle control device of FIGURES 3 and 4 taken substantially along line 6—6 of FIGURE 3 viewing in the direction of the arrows;

FIGURE 7 is a partial longitudinal cross-sectional view of the throttle control device of FIGURES 3 to 6 inclusive, taken substantially along the longitudinal axis of FIGURE 3;

FIGURE 8 is a transverse cross-sectional view of the throttle control device of the instant invention taken substantially along line 8—8 of FIGURE 7;

FIGURE 9 is an enlarged view of the selective constraining means of the throttle control device of the instant invention which, when assembled, surrounds the lower end thereof;

FIGURE 10 is a schematic view of one form of electrical circuit of the throttle control device of the instant invention; and FIGURE 11 is a schematic view of another form of electric circuit of the control device of the instant invention.

Figures 1, 2:
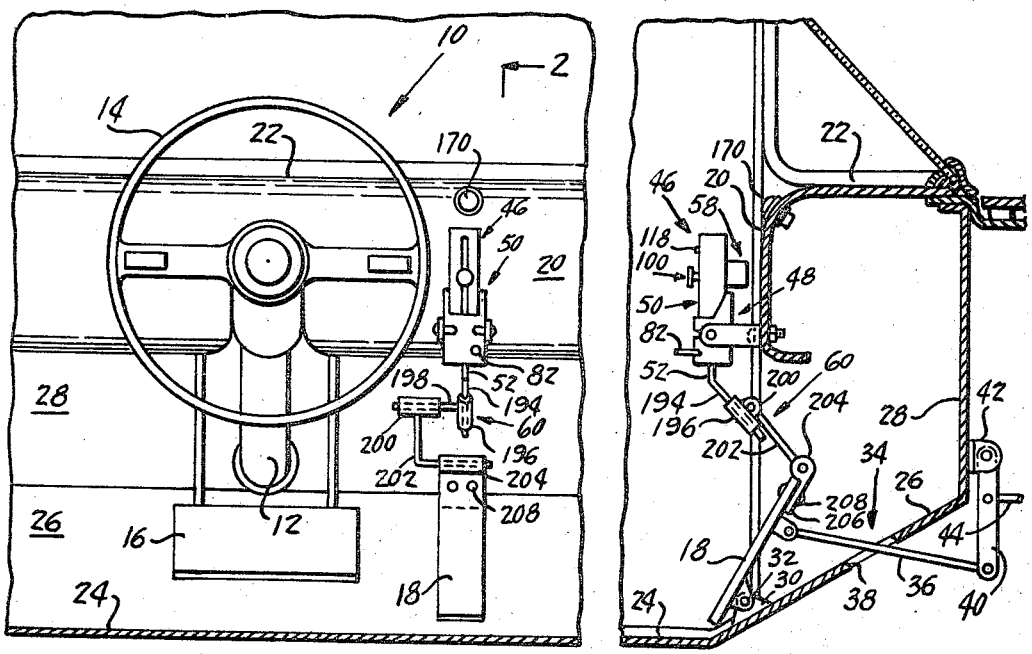
FIGURE 1 is a view of the driver's station of a motor vehicle, showing the device of the instant invention operatively attached to an accelerator pedal.
FIGURE 2 is a longitudinal cross-sectional view of the vehicle which is partially illustrated in FIGURE 1, taken substantially along line 2—2 thereof viewing in the direction of the arrows.

Referring now to the drawings in detail, wherein like reference characters designate like elements throughout the several views thereof, there is indicated generally at 10 an operator's station of a motor vehicle including the customary steering post 12, steering wheel 14, brake pedal 16, and accelerator pedal 18. As illustrated, the vehicle also provides the usual dash 20 and dash deck 22, as well as a floor 24 and the normally forwardly inclined floor 26 extending between floor 24 and a customary firewall 28. As may be seen in FIGURE 2, accelerator pedal 18 is pivotally mounted on inclined portion 26 by a pair of brackets 30 interconnected by a pivot pin 32.

Accelerator pedal 18 controls an associated engine through an accelerator linkage indicated generally at 34 including a link 36 extending through an opening 38 in inclined floor 26 and pivotally interconnecting accelerator pedal 18 and a control lever 40 in a known manner. Control lever 40 is pivotally mounted by a suitable bracket 42 onto the engine side of firewall 28 and pivotally carries a control rod 44 leading to the carburetor of an associated engine in a known manner. As is customary in the construction and operation of motor vehicles, the carburetor of the associated engine is equipped with a return spring for biasing control rod 44 such that accelerator pedal 18 is normally biased toward an idling position away from a position of maximum speed.

Movably mounted on dash 20 and operatively connected to accelerator pedal 18 is a throttle control device indicated generally at 46 which may be alternatively manipulated to provide for a predetermined maximum engine speed limit, to provide for a first predetermined intermediate engine speed limit, to maintain engine speed at a second predetermined intermediate rate and, when engine speed is being maintained at the second intermediate rate, to allow engine speed to return to an idling speed upon touching of the brake pedal. In additoin, throttle control device 46 is such that engine speed maintained at the second predetermined intermediate rate may be selectively increased by the vehicle driver simply by pressing upon accelerator pedal 18, all as will be more fully explained hereinafter.

Throttle control device 46 has as its major components a mounting means designated generally at 48 pivotally mounting a rod receiving housing designated generally at 50 on dash 20, or any other convenient location such as on steering post 12, with housing 50 receiving a reciprocably mounted rod 52. The movement of rod 52 is confined between the aforementioned limits by a sleeve designated generally at 54 received about housing 50 in conjunction with a releasably attached shoulder forming means designated generally at 56. An electromagnetic solenoid designated generally at 58 mounted on housing 50 and shoulder forming means 56 cooperate to provide the maintenance of vehicle speed at the second intermediate rate. Securing rod 52 to accelerator pedal 18 is an adjustable connecting means designated generally at 60.

Rod receiving housing 50 includes a cylindrical tube 62 forming a longitudinally extending slot 64, an oppositely disposed opening 66 positioned intermediate the ends of tube 62 and a pair of horizontally aligned openings 67 adjacent the lower end thereof, the purposes of which will be more fully explained hereinafter. Rotatably received about the lower end of housing 50 is sleeve 54 constituting a complementarily configured cylindrical tube 68 forming a first horizontal edge 70 and a vertically displaced second horizontal edge 72 connected in one direction by an arcuate edge 74 and in the other direction by a substantially vertical edge 76. As will be explained more fully hereinafter, first and second horizontal edges 70, 72 cooperate with rod 52 to provide a predetermined maximum engine speed limit and a first predetermined intermediate engine speed limit respectively.

The lower end of sleeve 54 forms a pair of aligned slots 78, 80 extending partially around the circumference of cylindrical tube 68 to allow for the rotatable mounting thereof. Completing the construction of sleeve 54 is an operating handle 82 which may be used to rotate sleeve 54 about the longitudinal axis of tube 68.

Mounting means 48 includes a U-shaped support 84 fixedly secured to dash 20 by a conventional bolt 86 and nut 88. Pivotally mounting rod receiving housing 50 and sleeve 54 between the open legs of U-shaped support 84 is a pivot pin 90 aligning a pair of openings 92 of support 84, slots 78, 80 of sleeve 54 and openings 67 of housing 50. It will be readily apparent that housing 50 and sleeve 54 may pivot about the axis of pin 90 to accommodate the movement of connecting means 60, as will be more fully explained hereinafter, with sleeve 54 being capable of undergoing rotary movement about its longitudinal axis because of the circumferential extent of slots 78, 80 as may be seen most clearly in FIGURE 6. As may be seen in FIGURES 3 and 4, sleeve 54 is received about housing 50 and mounted on U-shaped support 84 such that vertical edge 76 lies adjacent longitudinally extending slot 64 such that a slight rotary movement of sleeve 54 will position either of horizontal edges 70, 72 across slot 64.

Figures 3, 4:
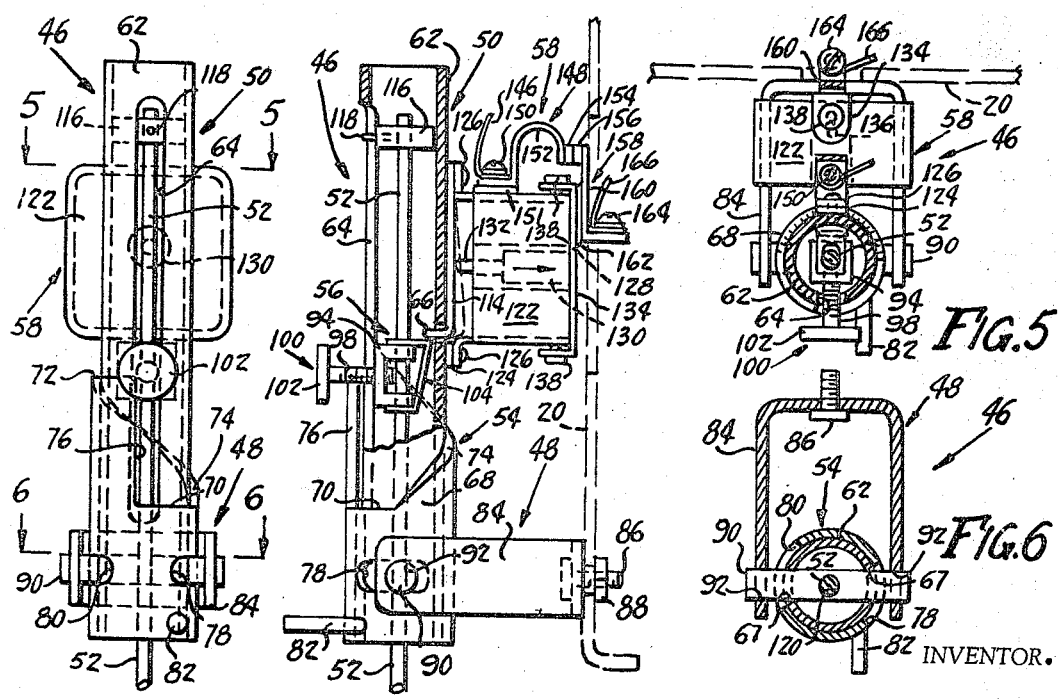
FIGURE 3 is a front elevational view of the throttle control device of the instant invention.
FIGURE 4 is a side elevational view of the device of FIGURE 3, certain parts being broken away for clarity of illustration.

Referring now to FIGURES 7 and 8 as well as FIGURES 3 and 4, shoulder forming means 56 includes a U-shaped brace 94 forming a pair of aligned openings through the legs thereof in which rod 52 may freely reciprocate with the other leg of brace 94 forming a threaded opening 96 into which extends a threaded shank 98 of a manually rotatable bolt 100 having an enlarged head 102. As is apparent from FIGURES 7 and 8 threaded shank 98 extends through longitudinal slot 64 of housing 50 with a U-shaped spring metal bracket designated generally at 104 having a pair of parallel legs 106, 108 slidably receiving rod 52 and providing a diagonal leg 110 such that the intersection of legs 106, 110 forms an abutment 112 which may be precluded from upward movement by an L-shaped arm 114 of solenoid 58 which extends through opening 66 of cylindrical tube 62. Lower parallel leg 108 is fixedly secured to the lower leg of brace 94 with upper leg 106 forming an elongate slot 227. As will be more fully explained hereinafter, there are certain situations when abutment 112 is positioned above arm 114. It will be apparent that the depression of rod 52, resulting from the depression of accelerator 18, will result in the camming of leg 106 away from arm 114 allowing abutment 112 to come to rest thereunder.

As intimated previously and as will be more fully explained hereinafter, connecting means 60 transmits the movement of accelerator pedal 18 to rod 52 such that an incremental depression of pedal 62 corresponds to an incremental movement of rod 52 within housing 50. Fixedly mounted on the upper end of rod 52 is a cylindrical plug 116 carrying a pointer 118 extending through slot 64 such that indicia may be placed on either side thereof to provide a means for correlating the movement of rod 52 with the speed of an associated engine. It will be readily apparent that plug 116 and shoulder forming means 56 act to position rod 52 centrally of housing 50, but it should also be noted that pivot pin 90 forms a central opening 120 through which rod 52 also extends. It should be pointed out, however, that pivot pin 90 may be made into two segments terminating short of the center of housing 50 obviating the need for opening 120 if such is desired.

It should accordingly be apparent that when accelerator pedal 18 is in an idling position, rod 52 will be in a first position substantially encased by housing 50 corresponding to the idling position of pedal 18. On the other hand, the depression of accelerator pedal 18 to achieve a maximum engine speed will reciprocate rod 52 to a second position substantially out of housing 50 corresponding to the maximum depression of pedal 18.

When it is desired to utilize throttle control 46 to establish a maximum speed reminder feature or to provide a predetermined maximum engine speed, it is necessary only to rotate bolt 100 such that shoulder forming means 56 is secured to rod 52 and to position sleeve 54, by way of operating handle 82, such that first horizontal edge 70 lies in the path of longitudinal slot 64 as may be seen in FIGURE 3. When the vehicle driver depresses accelerator pedal 18, rod 52 will reciprocate within housing 50 until threaded shank 98 comes into contact with first horizontal edge 70 thereby precluding additional depression of pedal 18. It should be apparent that horizontal edge 70, slot 64 and shoulder forming means 56 cooperate to confine the movement of rod 52 between a first position corresponding to the idling position of accelerator pedal 18 and a predetermined maximum position corresponding to the predetermined maximum speed of an associated engine with the predetermined maximum position lying between the first and second position.

When it is desired to utilize throttle control 46 to establish an intermediate speed reminder feature or to provide a predetermined intermediate engine speed, it is necessary only to rotate sleeve 54 by operating handle 82 to position second horizontal edge 72 within the path of longitudinal slot 64. When the vehicle driver depresses accelerator pedal 18, rod 52 will move within cylindrical tube 62 until threaded shank 98 comes into contact with second horizontal edge 72 thereby precluding additional depression of pedal 18. It should be apparent that horizontal edge 72, longitudinal slot 64 and shoulder forming means 56 cooperate to confine the reciprocable movement of rod 52 between a first idling position and a predetermined intermediate position for varying the speed of an associated vehicle engine between an idling speed and the first predetermined intermediate speed. Should extra engine speed be desired, sleeve 54 may be rotated to present first horizontal edge 70. The intermediate position may thereafter be readily restored by again rotating sleeve 54.

It should be pointed out that the return spring of the associated carburetor is sufficiently strong to reciprocate rod 52 and shoulder forming means 56 upwardly when the operator removes the foot from accelerator pedal 18. It should also be noted that shoulder forming means 56 may be reciprocated on rod 52 to provide a means for varying the predetermined maximum engine speed and the predetermined intermediate speed in much the same manner as is disclosed in the aforementioned application.

In order to provide means for maintaining the speed of the associated vehicle engine at a predetermined rate allowing the vehicle operator to remove the foot from accelerator pedal 18, electromagnetic solenoid 58 including L-shaped arm 114 is provided to selectively restrain shoulder forming means 56. Solenoid 58 includes a casing 122 fixedly secured to housing 50 by a plurality of supports 124 and frictional fasteners 126. As may be seen in FIGURE 4, spring biased L-shaped arm 114 is mounted by one of fasteners 126 for pivotal movement between a first position such that the short leg thereof extends interiorly of cylindrical tube 62 through opening 66 and a second position shown in dashed lines allowing shoulder forming means 56 to clear the short leg of L-shaped arm 114.

Solenoid 58 includes the customary annular winding 128 receiving a reciprocable plunger 130 therein having dielectric anti-magnetic insert 132 on the end thereof with engagement with arm 114. As illustrated in FIGURE 4, arm 114 is constructed to be biased toward insert 132, but it should be understood that arm 114 may be connected thereto in any suitable manner. Secured to the end of plunger 130 is a U-shaped arm 134 slidably mounted on casing 122 by a pair of vertically aligned elongate slots 136 formed by arm 134 and a pair of enlarged head fasteners 138, such as screws or the like.

Solenoid 58 is preferably equipped with a spring (not shown) normally biasing plunger 130 in the direction of the arrow shown in FIGURE 4 such that L-shaped arm 114 is normally in the dotted line position in FIGURE 4. As more fully explained hereinafter, solenoid winding 128 is connected to a source of electrical energy such that the energization thereof will reciprocate plunger 130 to move arm 114 into the solid line position precluding upward movement of shoulder forming means 56. When it is desired to maintain the speed of the associated vehicle engine at a predetermined rate, it is most convenient to secure shoulder forming means 56 to rod 52 below L-shaped arm 114 and then energize solenoid 58. The return spring of the associated carburetor will reciprocate rod 52 upwardly juxtaposing abutment 112 of shoulder forming means 56 against arm 114 thus insuring a predetermined fuel flow rate to the associated engine. The operator may remove the foot from accelerator pedal 18 and the vehicle will maintain the predetermined rate on a substantially level road.

Referring now to FIGURES 4 and 10, one side of solenoid winding 128 is connected by an electrical wire 140 to a suitable ground 142 with the other side thereof connected by a branch line 144 to an electrical conduit 146 leading to a stationary electrical connection indicated generally at 148. Stationary metallic connection 148 is secured to solenoid casing 122 by an insulating screw 150 with an insulator strip 151 interposed between connection 148 and casing 122 to provide electrical separation therebetween. It will be apparent that screw 150, which is made of dielectric material, places conduit 146 into electrical communication with metallic connection 148. Stationary connection 148 also includes a substantially U-shaped arm 152 carrying an electrical contact 154 on one leg thereof juxtaposed to a contact 156 of a movable electrical connection designated generally at 158. Movable connection 158 includes an L-shaped arm 160 secured by a dielectric strip 162 to U-shaped arm 134.

L-shaped arm 160 carries a releasable metallic fastener 164 to which an electrical wire 166 is releasably attached. Electric conduit 146 and electric wire 166 terminate in a pair of adjacent electrical connections 168 disposed adjacent an operating button 170 normally biased away from connections 168. The delivery of electrical energy through a power delivery wire 172, as will be more fully explained hereinafter, to fastener 164 will set the stage for the energization of solenoid winding 128 and the operation of solenoid 58. The depression of operating button 170, which may be positioned on dash 20 as seen in FIGURE 1, will deliver electrical energy through electrical wires 166, 146, 144 to solenoid winding 128 and then through wire 140 to ground 142 thereby energizing winding 128 and reciprocating plunger 130 to the left as may be seen in FIGURE 4. The reciprocation of plunger 130 will move U-shaped arm 134 in a similar direction thus closing contacts 154, 156 thus providing an additional electric circuit including movable arm 160, contacts 154, 156, stationary connection 148, and electrical wires 146, 144 to winding 128. Accordingly, the release of operating button 170 will not effect the energization of solenoid coil 128.

For purposes of convenience, the aforementioned electrical components are designated as a solenoid circuit shown generally at 174 to which electrical energy is delivered through power delivery wire 172. As may be seen in FIGURE 10, a direct current battery 176 is in communication with a ground 178 to a wire 180 with another electrical conduit 182 connecting battery 176 to an ignition switch 184. Ignition switch 184 is such that the rotation of a key to start the associated engine closes the contact between wire 182 and a wire 186 leading to a stationary electrical connection 188 juxtaposed to another electrical connection 190 in communication with power delivery wire 172. A brake operated switch 192 provides communication between connections 188, 190 when brake pedal 16 is in the normally released position. When an individual depresses brake pedal 16, switch 192 will be open thus severing electrical communication to solenoid circuit 174 consequently de-energizing solenoid winding 128. Since solenoid plunger 130 is preferably spring biased in the direction shown by the arrow in FIGURE 4, the de-energization of winding 128 will result in the retraction of plunger 130 and consequently L-shaped arm 114. It will be seen, therefore, that the deenergization of winding 128 will allow shoulder forming means 56 to move freely within housing 50 thus releasing throttle control 46 from its function of controlling the speed of the associated engine.

It will be readily apparent that throttle control 46 may maintain engine speed at a predetermined rate merely by tightening of bolt 100 to secure shoulder forming means 56 to rod 52, by closing ignition switch 154 and by depressing operating button 170. Solenoid 130 will be advanced to position of L-shaped arm 114 interiorly of cylindrical tube 62 thus blocking upward movement of shoulder forming means 56 produced by the action of a return spring on the associated carburetor thus holding the carburetor open at a predetermined rate of fuel flow. It should be noted that shoulder forming means 56 does not have to be secured to rod 52 below L-shaped arm 114 because of the camming action that will be produced by diagonal leg 110 upon the lowering of shoulder forming means 56 which will occur upon the depression of accelerator pedal 18. If shoulder forming means 56 should be secured to rod 52 above arm 114, the driver will depress accelerator pedal 18 such that diagonal leg 110 cams L-shaped arm 114 out of position. The passage of shoulder forming means 56 below L-shaped arm 114 will result in the return of arm 114 to the position shown in FIGURE 7 thus precluding movement of rod 52 upwardly.

When it is desired for the individual to increase the speed of the vehicle above the predetermined rate set by a cooperation of shoulder forming means 56 and L-shaped arm 114, it is necessary only for the operator to depress accelerator pedal 18. It should be pointed out that sleeve 54 may be positioned to preclude the speed of the vehicle past either the predetermined maximum rate or the predetermined intermediate rate.

Referring now to FIGURE 11, a simplified form of solenoid circuit is designated generally at 210, many of the components of which are identical to the circuit shown in FIGURE 10 with like reference characters being used for purposes of brevity. For example, a direct current battery 176 is connected to a ground 178 by wire 180 with another electrical conduit 182 leading to an ignition switch 184. Another electrical wire 186 connects ignition switch 184 to a brake-operated switch designated generally at 212 including a pivoted arm 214, which corresponds to the brake pedal lever connected to brake pedal 16 and which may be similar to switch 192. A stationary electrical contact 216 is positioned adjacent pivot arm 214 for contact therewith when brake pedal 16 is in the normally inactive position. Stationary electrical contact 216 is connected by an electrical wire 218 to a switch 220 which may be mounted on dash 20. Switch 220 is connected by a wire 222 to one side of solenoid winding 128 with a wire 224 connecting the other side of winding 128 to a suitable ground 226.

As is apparent, the closing of dash switch 220 and the rotation of ignition switch 184 to the engine operating position will deliver electrical current through solenoid winding 128 to reciprocate plunger 130 to the left as seen in FIGURE 4 to position L-shaped arm 114 in the blocking position. In this embodiment, as well as in the embodiment of FIGURE 9, it will be apparent that the touching of brake pedal 16 will de-energize winding 128 such that plunger 130 may be reciprocated to the right under the force of a spring. While it is apparent that the embodiment of FIGURE 11 is considerably simpler than the embodiment of FIGURE 10, switch 220 must remain closed until manually moved to the OFF position rather than having the automatic feature of operating button 170.

Referring now to FIGURES 1 and 2, adjustable connecting means 60 connects rod 52 to accelerator pedal 18 such that an incremental movement of pedal 18 will produce an identical incremental movement of rod 52. Fixedly joined to rod 52 is an angled rod 194 slidably received in a sleeve 196 and secured therein by a set screw or the like. Sleeve 196 fixedly carries a horizontally extending rod 198 slidably received in a sleeve 200 and releasably secured therein by any conventional means, such as a set screw or the like. Sleeve 200 in turn, fixedly carries an L-shaped rod 202 slidably and rotatably mounted in a sleeve 204 fixedly secured on the upper edge of accelerator pedal 18 by a flange 206 extending therebeneath and a plurality of frictional fasteners 208. It will be readily apparent that the adjustments provided by rods 194, 198 adjustably mounted in sleeves 196, 200 allows throttle control device 46 to be positioned within any type of vehicle regardless of the dimensions thereof.

It will be seen that the depression of accelerator pedal 18 by an operator will pivot control lever 40 thereby actuating a carburetor through control rod 44. Any movement undergone by accelerator pedal 18 will be transmitted to rod 52 by adjustable connecting means 60 with housing 50 being pivotable about pivot pin 90 to accommodate the distortion of the normally vertical rod 52 occasioned by variation of the angle of inclination of accelerator pedal 18.

It is now seen that there is herein provided an improved throttle control device having all the objects and advantages of the instant invention, and others, including many advantages of great practical utility and commercial importance.

Since many embodiments may be made of the instant inventive concept, and since many modifications may be made of the embodiments hereinbefore shown and described, it is to be understood that the foregoing is to be interpreted merely as illustrative and not in a limiting sense.

I claim:

1. A throttle control device for controlling the speed of a vehicle engine associated with a movably mounted accelerator pedal spring biased toward an idling position away from a position of maximum speed comprising
    rod means providing means for connection with said accelerator pedal,
    means movably mounting said rod means from a first position corresponding to said accelerator idling position to a second position corresponding to said accelerator maximum speed position,
    means for selectively confining movement of said rod means from said first position to a predetermined maximum position between said first position and said second position for varying the speed of said associated vehicle engine between an idling speed and a predetermined maximum speed,
    means for selectively confining movement of said rod means from said first position to a first predetermined intermediate position between said first position and said predetermined maximum position for varying the speed of said associated vehicle engine between an idling speed and a first predetermined intermediate speed, and
    means for selectively restraining said rod means at a second predetermined intermediate position maintaining the speed of said associated vehicle engine at a second predetermined intermediate speed and for allowing movement toward said predetermined maximum position whereby vehicular speed may be selectively increased including means for releasing said rod means from said second predetermined intermediate poistion for movement toward said first position for varying the speed of said associated vehicle engine from said second predetermined intermediate speed toward said idling speed.

2. The structure of claim 1 including means for varying said predetermined maximum position, and said first predetermined intermediate position for varying said predetermined maximum speed and said first predetermined intermediate speed.

3. The structure of claim 1 including means for varying said second predetermined intermediate position for varying said second intermediate speed.

4. The structure of claim 1 wherein said mounting means includes a housing surrounding at least a portion of said rod means and forming a longitudinally extending slot, said confining means includes a shoulder forming means on said rod means and within said housing, said shoulder forming means includes elongate means extending through said slot, said confining means includes means providing a first abutting edge for contact with said elongate means providing said predetermined maximum position and a second abutting edge spaced from said first abutting edge for contact with said elongate means providing said first predetermined intermediate position, said confining means includes means mounting said edge forming means for movement from at least a first position locating said first abutting edge in the path of said slot to a second position locating said second abutting edge in the path of said slot.

5. The structure of claim 4 wherein said edge forming means includes a sleeve rotatably mounted about said housing and provided with a handle whereby said sleeve may be rotated, said throttle control device includes means for pivotally mounting said housing and said sleeve in a substantially vertical position.

6. The structure of claim 5 wherein said restraining means includes an arm insertable through an opening formed by said housing for engagement with said shoulder forming means and means for inserting and withdrawing said arm from said housing.

7. The structure of claim 6 wherein said inserting and withdrawing means includes a solenoid secured on said housing.

8. The structure of claim 1 including a vehicle having an engine, an operator's station including a movably mounted accelerator pedal, a movably mounted brake pedal, linkage means connecting said pedal and said engine for controlling the speed thereof and spring means connected with said linkage means for biasing said pedal toward said idling position from said maximum speed condition, said connecting means connecting said rod means and said accelerator pedal.

9. The structure of claim 8 wherein said mounting means is secured in a substantially vertical position on said vehicle adjacent said accelerator pedal for limited pivotal movement about a substantially horizontal axis in order to accommodate movement of said accelerator pedal.

10. The structure of claim 8 wherein said rod means carries a shoulder forming means, said restraining means includes an arm engageable with said shoulder forming means and means for selectively inserting and withdrawing said arm from engagement therefrom.

11. The structure of claim 10 wherein said release means includes a solenoid secured on said mounting means, a solenoid circuit in electrical communication with said solenoid and including a switch adjacent said brake pedal for severing said circuit upon movement of said brake pedal from a normally non-braking position.

12. The structure of claim 8 wherein said connecting means includes means for adjusting the length thereof.

13. The structure of claim 8 wherein said throttle control is mounted substantially vertically above said accelerator pedal, said pedal carries a sleeve forming a horizontal opening, said connecting means includes a first sleeve releasably adjustably securing said rod means therein, a first rod horizontally fixedly secured to said first sleeve, a second sleeve releasably adjustably securing said first rod therein, said second sleeve fixedly carrying an L-shaped rod having a horizontal portion rotatably received in said accelerator sleeve.

14. A throttle control for controlling the speed of a vehicle engine associated with a movably mounted accelerator pedal spring biased toward an idling position away from a position of a maximum speed comprising a rod providing means for connection with said accelerator pedal, a housing surrounding at least a portion of said rod and reciprocably movably mounting said rod from a first position corresponding to said accelerator idling position to a second position corresponding to said accelerator maximum speed position, said housing forming a slot disposed generally along the path of said movable rod and an opening spaced away from said slot, means on said rod forming a shoulder within said housing and including an elongate member extending outwardly of said housing through said slot, a sleeve rotatably mounted about one end of said housing providing a first abutting edge adjacent said slot between said first and second positions establishing a predetermined maximum speed of said associated engine, a second abutting edge adjacent said slot between said first abutting edge and said first position establishing a first predetermined intermediate speed of said associated engine and a handle for rotating said sleeve from a first position where said abutting first edge blocks said slot to a second position where said second abutting edge blocks said slot, an arm movably mounted on said housing adjacent said opening for movement into said housing for engaging said shoulder precluding movement of said rod toward said first position and means for inserting and withdrawing said arm from said opening.

References Cited

UNITED STATES PATENTS

| | | | |
|---|---|---|---|
| 2,533,836 | 12/1950 | Patterson | 192—3 X |
| 2,906,141 | 9/1959 | Kocsi | 74—526 X |
| 3,168,943 | 2/1965 | Thorner | 192—3 |
| 3,293,937 | 12/1966 | Gardner | 74—526 |

BENJAMIN W. WYCHE III, *Primary Examiner.*